(12) United States Patent
Kuchenbrod et al.

(10) Patent No.: US 10,354,110 B2
(45) Date of Patent: Jul. 16, 2019

(54) BARCODE READERS HAVING MULTIPLE IMAGE SENSORS AND METHODS ASSOCIATED THEREWITH

(71) Applicant: SYMBOL TECHNOLOGIES, LLC, Lincolnshire, IL (US)

(72) Inventors: Harry E. Kuchenbrod, Kings Park, NY (US); Caihua Chen, Cupertino, CA (US); Daniel F. Brown, Norhtport, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/800,826

(22) Filed: Nov. 1, 2017

(65) Prior Publication Data

US 2019/0130140 A1 May 2, 2019

(51) Int. Cl.
*G06K 7/10* (2006.01)

(52) U.S. Cl.
CPC ....... *G06K 7/1096* (2013.01); *G06K 7/10386* (2013.01); *G06K 7/10831* (2013.01); *G06K 7/10861* (2013.01)

(58) Field of Classification Search
CPC ...................................................... G06K 7/10
USPC .................................. 235/462.01–462.49, 454
See application file for complete search history.

(56) References Cited

U.S. PATENT DOCUMENTS

| 2007/0102520 A1* | 5/2007 | Carlson | G06K 7/10722 235/454 |
| 2009/0026267 A1* | 1/2009 | Wang | G06K 7/10 235/440 |
| 2015/0269403 A1* | 9/2015 | Lei | G06K 7/10831 235/462.24 |

* cited by examiner

*Primary Examiner* — Daniel A Hess
(74) *Attorney, Agent, or Firm* — Yuri Astvatsaturov

(57) ABSTRACT

Embodiments of the present invention generally relate to the field of barcode readers, and more particularly, to barcode readers having multiple linear image sensors. In an embodiment, a barcode reader includes a first optical assembly including a first linear imaging sensor, a second optical assembly including a second linear imaging sensor, and a controller connected configured to: simultaneously cause both of the first linear imaging sensor and the second linear imaging sensor to respectively capture light from a first FOV and a second FOV for a predetermined amount of time, and simultaneously capture a first output signal from the first linear imaging sensor and a second output signal from the second linear imaging sensor.

10 Claims, 3 Drawing Sheets

BARCODE READERS HAVING MULTIPLE IMAGE SENSORS AND METHODS ASSOCIATED THEREWITH

BACKGROUND

Barcodes have become commonplace in a wide variety of settings. Their ability to convey data and be read with relative ease have provided a basis for their use in retail, healthcare, enterprise, transportation and logistics, and many other environments. Especially popular are one-dimensional (1D) or linear barcodes that are defined by a series of parallel lines having varying widths and spacings there between.

With the broad popularity of barcodes across different sectors comes the needs for a wide range of barcode readers, varying in ruggedness, complexity, cost, features, and so on. One particular feature that is often desired is the ability for a reader to capture decodable data at various working distances. In some instances, this feature is enabled by way of intricate adjustable optics that alter the working distance based on a host of parameters like measured distance or image analysis. This, however, requires a relatively high level of complexity along with increase amounts of computing/image processing power. In other instances, this feature is enabled by way of multiple image sensors, with each of those sensors being individually controlled to capture image data pursuant to various parameters. These systems add a level of complexity in that they require separate drivers to drive the multiple image sensors in accordance with the desired settings.

Accordingly, there remains a need for improved barcode reading devices and methods associated therewith that provide reduced levels of cost and complexity while providing some of the basic necessary features.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
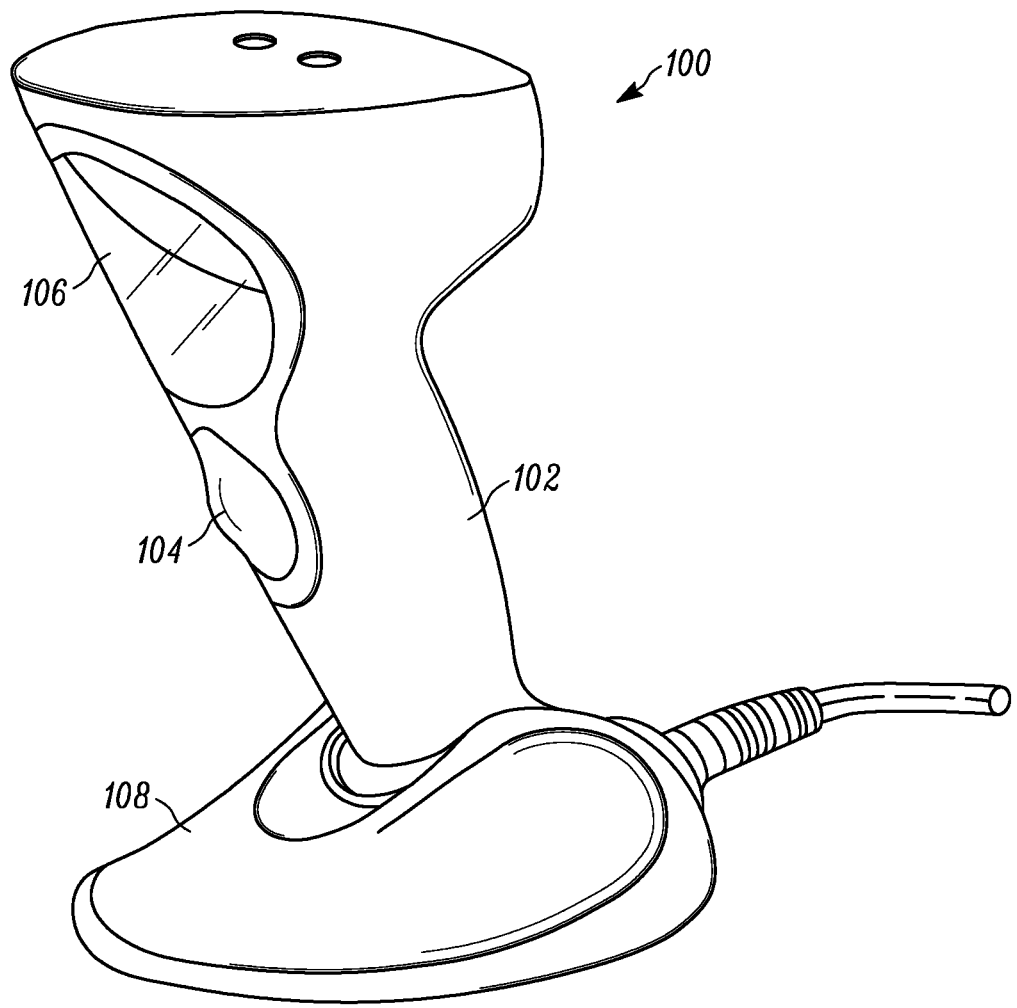
FIG. 1 illustrates a perspective view of a barcode reader according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, the present invention is a barcode reader comprising. The barcode reader includes: a housing having at least one window; a first optical assembly including a first linear imaging sensor, the first optical assembly having a first field of view (FOV) extending through the at least one window, the first optical assembly having a first maximum working distance; a second optical assembly including a second linear imaging sensor, the second optical assembly having a second FOV extending through the at least one window, the second optical assembly having a second maximum working distance that is greater than the first maximum working distance; and a controller connected to the first linear imaging sensor and further connected to the second linear imaging sensor, the controller being configured to: simultaneously cause both of the first linear imaging sensor and the second linear imaging sensor to respectively capture light from the first FOV and the second FOV for a predetermined amount of time; and simultaneously capture a first output signal from the first linear imaging sensor and a second output signal from the second linear imaging sensor.

Referring now to the drawings, FIG. 1 illustrates an exemplary barcode reader having a housing 102 with a trigger 104 and a window 106. Included in the embodiment is also a base 108 configured to stand on a surface and support the housing 102 in a generally upright position. The barcode reader 100 can be used in a hands-free mode as a stationary workstation when it is placed on the countertop. The barcode reader 100 can also be used in a handheld mode when it is picked up off the countertop and held in an operator's hand. In the hands-free mode, products can be slid, swiped past, or presented to the window 106. In the handheld mode, the barcode reader 100 can be moved towards a barcode on a product, and the trigger 104 can be manually depressed to initiate imaging of the barcode. In some implementations, the base 108 can be omitted, and the housing 102 can also be in other handheld or non-handheld shapes.

Figure 2:
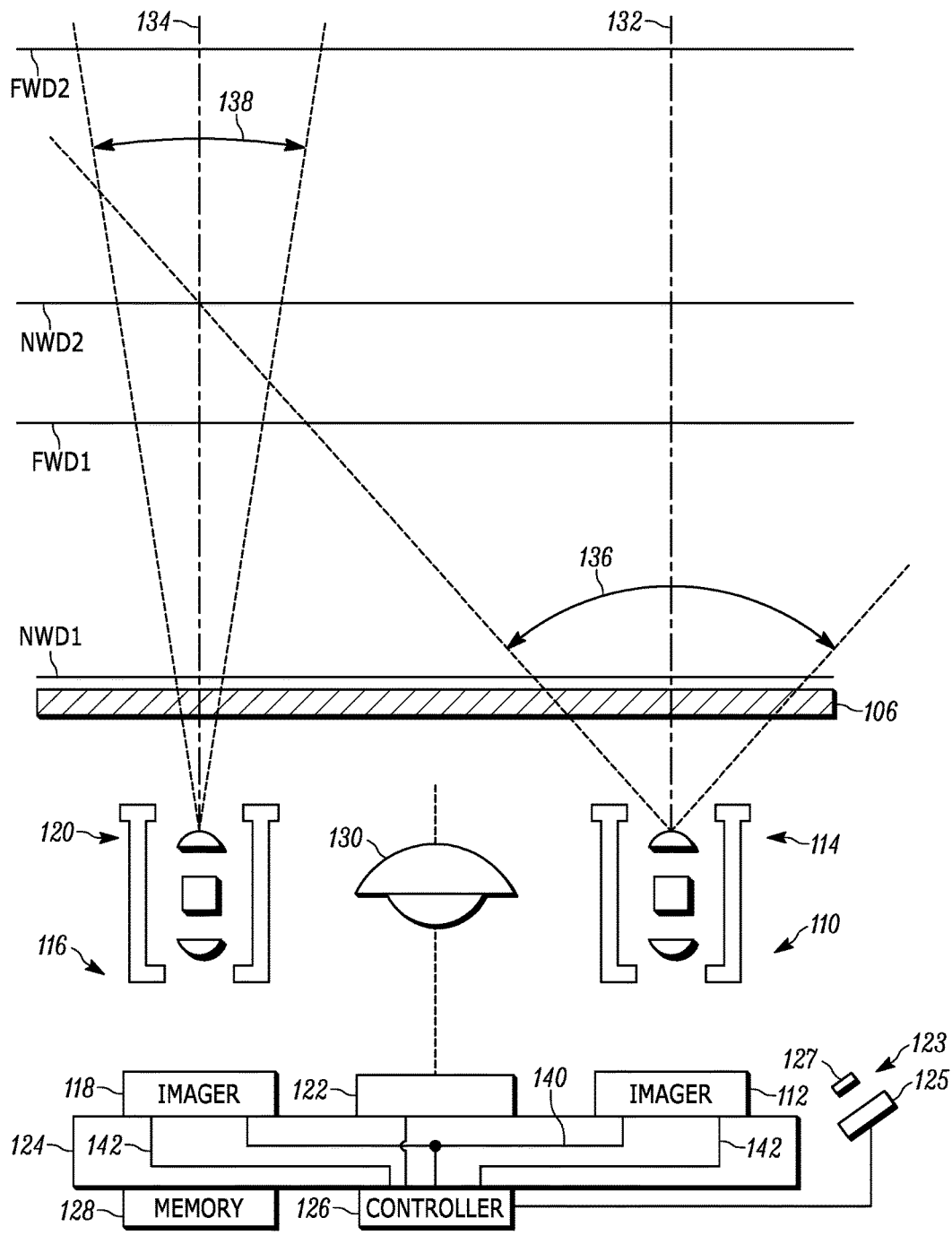
FIG. 2 illustrates a block schematic diagram some of the components of the barcode reader of FIG. 1.

FIG. 2 illustrates a block schematic diagrams of a portion of a barcode reader 100 in accordance with some embodiments. It should be understood that FIG. 2 is not drawn to scale. The barcode reader 100 in FIG. 2 includes the following components: (1) a first optical assembly 110 that includes a first linear imaging sensor 112 and a first imaging lens assembly 114; (2) a second optical assembly 116 that includes a second linear imaging sensor 118 and a second imaging lens assembly 120; (3) an illumination source 122; (4) a printed circuit board (PCB) 124 supporting the first and second linear imaging sensors 112, 118, and the illumination source 122; (5) a controller 126 positioned on the PCB 124 and communicatively coupled to the first and second linear imaging sensors 112, 118, and the illumination source 124; (6) a memory 128 connected to the controller 126; (7) an illumination lens assembly 130 positioned in front of the illumination source 122; and (8) an aiming light assembly 123 having an aiming light source 125 and an aiming lens assembly 127.

The first and second linear imagers 112, 118 can be either CCD or CMOS linear imaging sensors that generally include multiple photosensitive pixel elements aligned in one-dimensional array. The first and second linear imagers 112, 118 are operative to detect light captured, respectively, by the first and second imaging lens assemblies 114, 120 along a respective optical path or axis 132, 134 through the window 106. Generally, each respective linear imager and imaging lens assembly pair is designed to operate together for capturing light scattered, reflected, or emitted from a barcode as pixel data over a one-dimensional field of view (FOV). However, each lens/imager pair (also referred to as an optical assembly) is configured with different parameters.

In the currently described embodiment, the first optical assembly 110 is designed to read barcodes over a relatively near working distance that extends between NWD1 and NWD2. In some embodiments, NDW1 is approximately 0 inches from the window 106 and NWD2 is approximately 28 to 32 inches from the window 106. Additionally, optical assembly 110 captures light from a relatively wider FOV 136. On the other hand, the second optical assembly 116 is designed to read barcodes over a relatively far working distance that extends between FWD1 and FWD2. In some embodiments, FDW1 is approximately 24 inches from the window 106 and FWD2 is approximately 600 to 680 inches from the window 106. Additionally, optical assembly 116 captures light from a relatively narrower FOV 138.

Those of ordinary skill will be aware of the relationship between a desired FOV and working distance, and an optical assembly's focal length, lens configuration, and aperture. Thus, each imaging lens assembly may be configured as needed (appropriate focal length, lens configuration, and/or aperture may be selected) to obtain the desired set of parameters. In a preferred embodiment, each imaging lens assembly is a fixed focus assemblies. Additionally, in a preferred embodiment, each imaging lens assembly is configured such that the amount of light captured by each of the first and second linear imaging sensors 112, 118 is within 20% of one another (this assumes that both sensors are activated for the same exposure duration). As an example, if one is to consider an amount of irradiance of each of the linear imaging sensor from a given light source positioned within each of the optical assemblies' FOV, each of the two the optical assemblies is configured such that the amount of irradiance of each of the linear imaging sensors is within 20% of each other. In an embodiment, this functionality is achieved by having the first optical assembly 110 include a fixed focus lens arrangement with a focal length of 16 mm and a rectangular aperture of 2 mm×0.9 mm, and by further having the second optical assembly 116 include a fixed focus lens arrangement with a focal length of 30 mm and a rectangular aperture of 4 mm×1.8 mm. In some embodiments, this functionality can also be achieved by configuring each optical assembly f-numbers that are within 10% of each other. For example, the first optical assembly 110 can have an f-number of 10.9 and the second optical assembly 116 can have an f-number of 9.9. In some embodiments, it is preferable to configure the first optical assembly 110 to provide more light to the imaging sensor 112 as compared to the amount of light provided to the second imaging sensor 118 via the second optical assembly 116.

In FIG. 2, the controller 126, such as a microprocessor, is operatively connected to the linear imagers 112, 118. Preferably, the input of each of the linear imagers 112, 118 is connected to the controller via a parallel connection 140. This can be done by connecting the imagers to the controller by way of a single controller output channel (e.g., using the same pin(s) on the controller 126 for connecting both linear imagers 112, 118). In other examples, this may be achieved by connecting the imagers to two separate controller outputs that are configured to operate in parallel. Additionally, the output of each sensor 112, 118 is also connected to the controller 126. In a preferred configuration, this includes connecting each imager to the controller via its own communication link 142.

Parallel connection of the imagers to the controller can be advantageously used to activate and deactivate both image sensors 112, 118 simultaneously, thereby causing each sensor to capture data for the same exposure duration. This configuration lends itself particularly well to implementations with linear image sensors as these sensors can lack additional electronic measures that adjust image capture parameters internal to the sensors themselves. In essence, both imagers can be driven by a single output channel, reducing power and computing consumption, and the need for a more complicated processor with multiple output channels. This can be further simplified by using identical sensors for the first and second imagers 112, 118 so that the same driver signal can be applied to both sensors equally.

The simultaneous activation and deactivation can further be leveraged to simultaneously capture and potentially analyze sensor data. In some cases, the analysis includes analyzing image data from one of the image sensors to determine whether a decodable barcode has been captured therein, and proceeding to analyze the image data from the other imager sensor is a decode cannot be obtained from the first image. In other cases, image data from both image sensors can be analyzed simultaneously to determine a presence of a decodable barcode therein. In embodiments where the imagers output an analog signal, an analog-to-digital converter(s) is provided (either before or within the controller 126) to convert the analog signals to digital signals for processing.

With both optical assemblies 110, 116 being fixed focus, with linear image sensors 112, 118 being activated and deactivated simultaneously, and with image data from both imagers being captures and potentially processed simultaneously, the duration from initial trigger activation to the decode of a barcode may be markedly improved.

In addition to being connected to the image sensors, the controller 126 is further connected to the illumination source 112 and the aiming light source 125 for controlling the operation of these components. The controller 126 can also be used to control other devices in the imaging scanner. The reader 100 also includes a memory 128 that can be accessible by the controller 126 for storing and retrieving data. In some embodiments, the controller 126 also includes a decoder for decoding one or more barcodes that are captured by the linear imagers 112, 118. In some implementations, the barcode can be decoded by digitally processing a captured image of the barcode with a microprocessor.

In operation in accordance with some embodiments, the controller 126 sends a command signal to energize the illumination source 125 for a predetermined illumination time period. The controller 126 then causes the linear imaging sensors to activate in an effort to capture an image of a barcode. The captured images of are transferred to the controller 126 as pixel data. Such pixel data is digitally processed by the decoder in the controller 126 to decode the barcode, if one is present within either FOV 136 or FOV 138. The information obtained from decoding the barcode is then stored in the memory 128 or sent to other devices for further processing.

Figure 3:
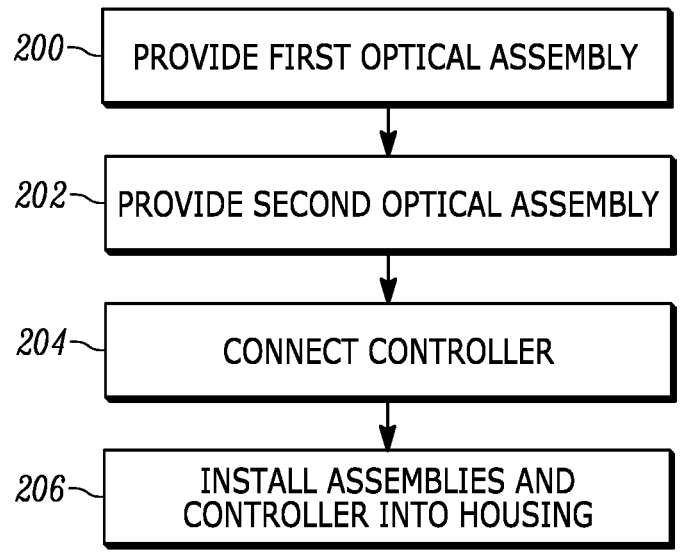
FIG. 3 illustrates a flowchart representative of a method of manufacturing a barcode scanner according to an embodiment of the present invention.

Referring now to FIG. 3, shown therein is a flowchart representative of a method of manufacturing a barcode scanner in accordance with the present disclosure. In step 200, the method includes providing a first optical assembly including a first linear imaging sensor, the first optical assembly having a FOV, the first optical assembly having a first maximum working distance. In step 202, the method includes providing a second optical assembly including a second linear imaging sensor, the second optical assembly having a second FOV extending through the at least one window, the second optical assembly having a second maximum working distance that is greater than the first maximum working distance. In step 204, the method includes connecting a controller to the first linear imaging sensor and the second linear imaging sensor, the controller being operable to: simultaneously cause both of the first linear imaging sensor and the second linear imaging sensor to respectively capture light from the first FOV and the second FOV for a predetermined amount of time; and simultaneously capture a first output signal from the first linear imaging sensor and a second output signal from the second linear imaging sensor. Finally, in step 206 the method includes installing the first optical assembly, the second optical assembly, and the controller inside of a housing having at least one window such that each of the first FOV and the second FOV extends through the at least one window.

Figure 4:
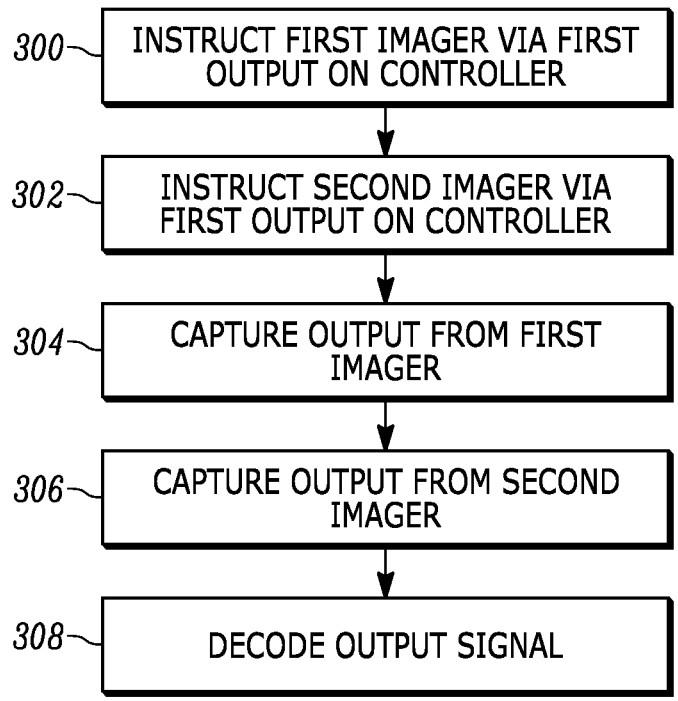
FIG. 4 illustrates a flowchart representative of a method of reading a barcode according to an embodiment of the present invention.

FIG. 4 illustrates another flowchart representative of a method of reading a barcode with a barcode reader having a first linear image sensor, a second linear image sensor, and a controller. In step 300, the method includes instructing, via a first output channel on the controller, the first linear image sensor to capture first light data for a predetermined amount of time. In step 302, the method includes instructing, via the first output channel on the controller, the second linear image sensor to capture second light data for the predetermined amount of time, the operation of instructing the first linear image sensor and the operation of instructing the second linear image sensor occurring simultaneously. In step 304, the method includes capturing, via the controller, a first output signal from the first linear image sensor. In step 306, the method includes capturing, via the controller, a second output signal from the second linear image sensor. Preferably steps 304 and 306 are performed simultaneously. Finally, in step 308, the method includes decoding at least one of the first output signal and the second output signal.

While the above-described embodiments have been described with reference to two image sensors, that is merely exemplary and additional sensors can be implemented in the system in the same manner as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A barcode reader comprising:
   a housing having at least one window;
   a first optical assembly including a first linear imaging sensor, the first optical assembly having a first field of view (FOV) extending through the at least one window, the first optical assembly having a first maximum working distance;
   a second optical assembly including a second linear imaging sensor, the second optical assembly having a second FOV extending through the at least one window, the second optical assembly having a second maximum working distance that is greater than the first maximum working distance; and
   a controller connected to the first linear imaging sensor and further connected to the second linear imaging sensor, the controller configured to:
      simultaneously cause both of the first linear imaging sensor and the second linear imaging sensor to respectively capture light from the first FOV and the second FOV for a predetermined amount of time; and
      simultaneously capture a first output signal from the first linear imaging sensor and a second output signal from the second linear imaging sensor,
   wherein the first maximum working distance is approximately between 28 and 32 inches, and wherein the second maximum working distance is approximately between 600 and 680 inches.

2. The barcode reader of claim 1, wherein the first linear imaging sensor and the second linear imaging sensor are connected to the controller in parallel.

3. The barcode reader of claim 1, wherein the first linear imaging sensor and the second linear imaging sensor are both connected to a first output channel of the controller.

4. The barcode reader of claim 1, wherein the controller is further configured to simultaneously analyze the first output signal from the first linear imaging sensor and the second output signal from the second linear imaging sensor.

5. The barcode reader of claim 1, wherein each of the first output signal and the second output signal is an analog signal.

6. The barcode reader of claim 5, wherein the controller includes at least one analog-to-digital converter, and wherein the controller is further configured to use the at least one analog-to-digital converter to convert each of the first output signal and the second output signal from the analog signal to a digital signal.

7. The barcode reader of claim 1, wherein the first optical assembly is configured to provide a first amount of irradiance to the first linear imaging sensor from a given light source, wherein the second optical assembly is configured to provide a second amount of irradiance to the second imaging sensor from the given light source, and wherein the second amount of irradiance is within less than or equal to 20% of the first amount of irradiance.

8. The barcode reader of claim 7, wherein the second amount of irradiance is greater than the first amount of irradiance.

9. The barcode reader of claim 1, wherein each of the first optical assembly and the second optical assembly includes a respective fixed-focus lens.

10. The barcode reader of claim 1, wherein the first linear imaging sensor and the second linear imaging sensor are identical.

* * * * *